United States Patent
Max et al.

(10) Patent No.: US 11,161,511 B2
(45) Date of Patent: Nov. 2, 2021

(54) METHOD FOR SUPPORTING GUIDANCE OF AT LEAST ONE TRANSPORTATION VEHICLE, ASSISTANCE SYSTEM, AND TRANSPORTATION VEHICLE

(71) Applicant: VOLKSWAGEN AKTIENGESELLSCHAFT, Wolfsburg (DE)

(72) Inventors: Stephan Max, Gifhorn (DE); Thorben Günzel, Braunschweig (DE); Sven Klomp, Uetze / Dollbergen (DE)

(73) Assignee: VOLKSWAGEN AKTIENGESELLSCHAFT

( * ) Notice: Subject to any disclaimer, the term of this patent is extended or adjusted under 35 U.S.C. 154(b) by 247 days.

(21) Appl. No.: 16/412,466

(22) Filed: May 15, 2019

(65) Prior Publication Data
US 2019/0359214 A1    Nov. 28, 2019

(30) Foreign Application Priority Data
May 23, 2018    (DE) .................. 10 2018 208 105.0

(51) Int. Cl.
*B60W 30/18*    (2012.01)
*G06K 9/00*    (2006.01)

(52) U.S. Cl.
CPC ... *B60W 30/18154* (2013.01); *G06K 9/00798* (2013.01); *G06K 9/00818* (2013.01); *G06K 9/00825* (2013.01); *B60W 2554/4041* (2020.02); *B60W 2555/60* (2020.02)

(58) Field of Classification Search
CPC ....... B60W 2555/60; B60W 30/18159; B60W 30/18154; B60W 60/0027; B60Y 2300/18158; G01C 21/3492
See application file for complete search history.

(56) References Cited

U.S. PATENT DOCUMENTS

| | | | |
|---|---|---|---|
| 9,459,623 B1 | 10/2016 | Raghu | |
| 9,534,910 B2 | 1/2017 | Okumura | |
| 9,779,624 B2 | 10/2017 | Lefevre et al. | |
| 9,947,215 B2 | 4/2018 | Di Censo et al. | |
| 10,173,675 B2 | 1/2019 | Lopez et al. | |
| 10,186,150 B2 | 1/2019 | Aoki et al. | |

(Continued)

FOREIGN PATENT DOCUMENTS

| | | |
|---|---|---|
| CN | 106871915 A | 6/2017 |
| CN | 107111942 A | 8/2017 |

(Continued)

OTHER PUBLICATIONS

Translation of JP-201904601.*

*Primary Examiner* — Kenneth J Malkowski
(74) *Attorney, Agent, or Firm* — Barnes & Thornburg LLP

(57) ABSTRACT

A method for assisting an operation at least of one transportation vehicle, a corresponding assist system and the corresponding transportation vehicle. Respective environmental data are collected by transportation vehicles in areas in which two roads meet. A respective priority action is automatically determined from the environmental data for the areas. The determined priority actions are used to automatically determine priority rules for the areas. The determined priority rules are provided to at least one transportation vehicle to be operated to assist the operation of the transportation vehicle.

19 Claims, 2 Drawing Sheets

(56) References Cited

U.S. PATENT DOCUMENTS

| | | | |
|---|---|---|---|
| 10,685,561 B2 | 6/2020 | Zydek et al. | |
| 2009/0326751 A1* | 12/2009 | Otake | B60T 7/22 |
| | | | 701/25 |
| 2016/0161270 A1 | 6/2016 | Okumura | |
| 2016/0161271 A1 | 6/2016 | Okumura | |
| 2017/0158193 A1 | 6/2017 | Lopez et al. | |
| 2017/0337819 A1 | 11/2017 | Wei et al. | |
| 2018/0218601 A1* | 8/2018 | Aoki | G08G 1/096725 |
| 2018/0276989 A1 | 9/2018 | Braeuchle et al. | |
| 2019/0043354 A1* | 2/2019 | Oluwafemi | G08G 1/127 |
| 2019/0333373 A1* | 10/2019 | Fang | G08G 1/096741 |
| 2019/0355245 A1* | 11/2019 | Gigengack | G08G 1/0129 |
| 2020/0286386 A1* | 9/2020 | Zhou | G08G 1/164 |

FOREIGN PATENT DOCUMENTS

| | | |
|---|---|---|
| CN | 107111946 A | 8/2017 |
| DE | 102011082761 A1 | 3/2012 |
| DE | 102011082375 A1 | 3/2013 |
| DE | 102012219721 A1 | 4/2014 |
| JP | 2005332297 A | 12/2005 |
| JP | 2010026618 A | 2/2010 |
| JP | 2019046013 A * | 3/2019 |
| KR | 20160075607 A | 6/2016 |
| KR | 20170066357 A | 6/2017 |
| WO | 2017013746 A1 | 1/2017 |

\* cited by examiner

METHOD FOR SUPPORTING GUIDANCE OF AT LEAST ONE TRANSPORTATION VEHICLE, ASSISTANCE SYSTEM, AND TRANSPORTATION VEHICLE

PRIORITY CLAIM

This patent application claims priority to German Patent Application No. 10 2018 208 105.0, filed 23 May 2018, the disclosure of which is incorporated herein by reference in its entirety.

SUMMARY

Illustrative embodiments relate to a method for assisting an operation at least of one transportation vehicle, to a corresponding assist system for a transportation vehicle and to a transportation vehicle having an assist system of this type.

BRIEF DESCRIPTION OF THE DRAWINGS

An exemplary embodiment is described below. In the drawings.

DETAILED DESCRIPTION

Figure 1:
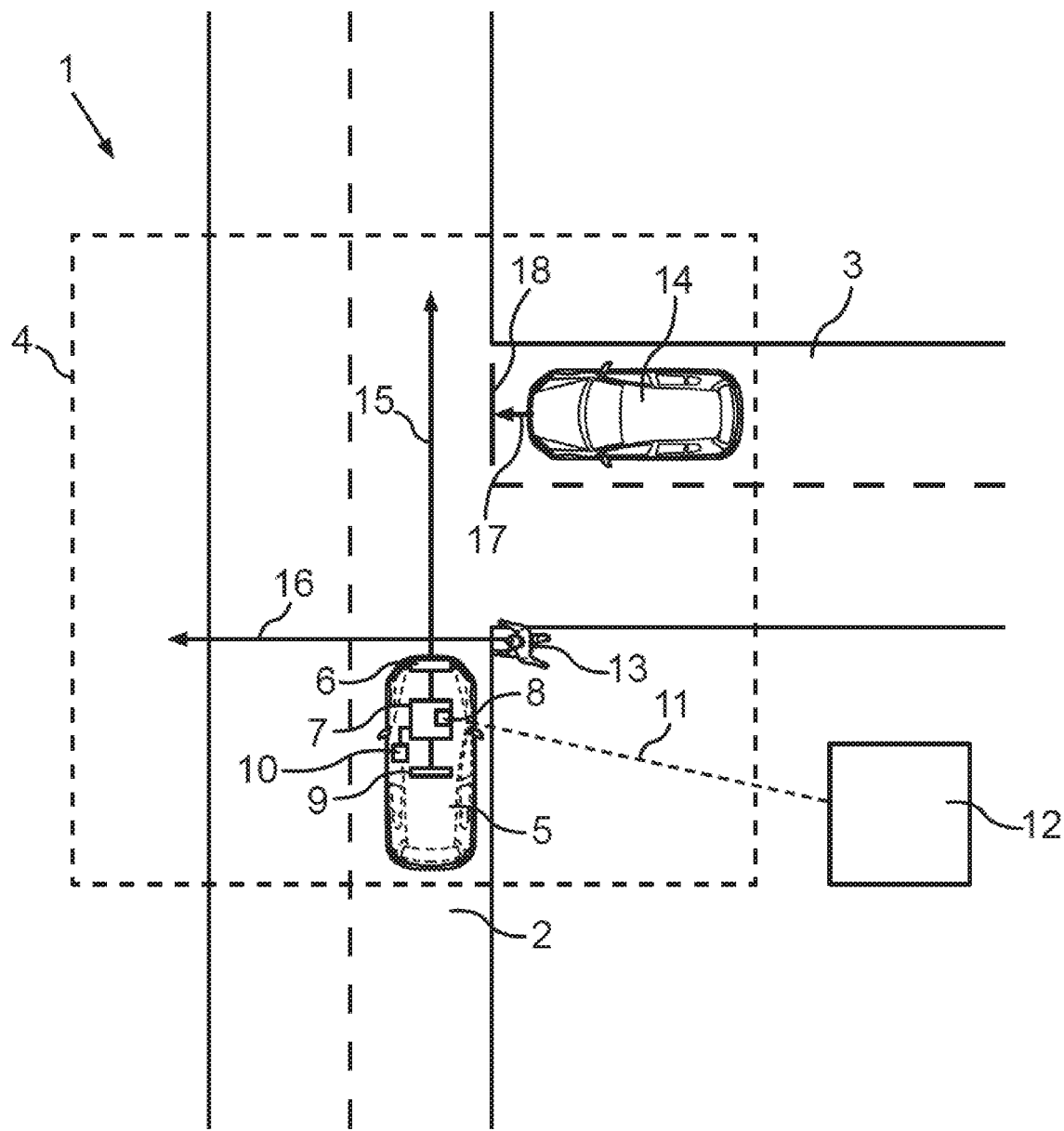
FIG. 1 illustrates a schematic overview of an exemplary traffic situation with a junction area in which multiple traffic participants meet.

To be able to move a transportation vehicle safely in traffic events, it is essential to understand a respective traffic situation. This means that relevant traffic regulations must be known for the respective traffic situation. This applies both for human drivers of the transportation vehicle and also for automated devices that operate, in other words control, the transportation vehicle in an autonomous drive mode. So as to assist the respective driver and likewise to render possible the autonomous drive mode, it is possible nowadays by way of example to automatically recognize traffic signs. However, when doing so it is problematic that this is not always reliably possible since the traffic signs may be hidden by way of example by other traffic participants or other obstacles, the traffic signs may be illegible owing to dirt or damage or they may even be missing altogether.

DE 10 2011 082 761 A1 describes a computer-implemented method. In this case, it is determined that a transportation vehicle driving characteristic has exceeded an expected parameter and subsequently a display of transportation vehicle GPS coordinates is interrupted if an abort tolerance is exceeded. Dependent upon a predetermined number of displayed transportation vehicle GPS co-ordinates, a traffic control feature that is associated at least with one set of GPS coordinates is determined and stored.

DE 10 2012 219 721 A1 discloses a drive assist method for increasing the drive comfort, wherein a state of a section of road that is to be driven along and drive lanes of this road section are identified and a drive lane recommendation for the road section is output. By way of example, the news that a lane change is recommended owing to pot holes 500 m away may be output as a drive lane recommendation.

A method for reducing the load on a driver during the operation of a transportation vehicle is known from DE 10 2011 082 375 A1. In this case, the driver sends a query to a controller as to whether the controller is able to assume at least a part function of the operation of the transportation vehicle. Following a corresponding check, the controller assumes the operation of the part-function of the transportation vehicle if a predetermined parameter is fulfilled. The controller may then assume the operation of the part-function if the check has determined that there is no traffic jam, no road works, no crossroads, no junction, no fork in the road and no particular hazardous situations and that such events may not occur.

Disclosed embodiments render it possible to operate a transportation vehicle in a safe and reliable manner.

A disclosed method is used to assist an operation at least of one transportation vehicle. In the case of the disclosed method, respective environmental data that characterize a respective surrounding traffic situation are collected using a respective environment sensor system of a multiplicity of transportation vehicles. In other words therefore each of the transportation vehicles comprises a dedicated environment sensor system that scans the environment of the respective transportation vehicle. The environment sensor system may by way of example include one or more cameras and/or further sensors, by way of example radar sensors, lidar sensors and/or laser sensors that comprise respectively transmitting and receiving devices. It is provided that the environmental data are automatically collected in areas in which a respective first road, which is being driven along by the respective transportation vehicle, and a respective second road, on which a respective other traffic participant is located, meet. The collected environmental data for the areas are then used as a respective priority action to automatically determine whether the respective transportation vehicle awards or has awarded the respective other traffic participant priority with the result that the respective other traffic participant traverses or rather has traversed the respective area prior to the respective transportation vehicle or conversely.

An action to be taken by the traffic participants that meet one another in the respective area is therefore determined with respect to priority being awarded or being claimed. The priority action therefore indicates how the respective traffic participants involved react or rather have reacted in the respective traffic situation. The multiplicity of determined priority actions are used to automatically determine priority rules for the areas. In a disclosed embodiment, the determined priority rules are then provided in the at least one transportation vehicle that is to be operated.

It is therefore determined in a multiplicity of individual cases respectively which of at least two traffic participants who enter a crossroads or junction area simultaneously, in other words who meet one another, drive or move off first and which of the at least two traffic participants who meet one another allow the respective other traffic participant to drive or move off first. The multiplicity of transportation vehicles that perform this, in other words that collect the corresponding environmental data, may in this case individually and as a total identify one or more areas or rather corresponding traffic situations. It is possible for the same transportation vehicle and/or different transportation vehicles to drive through a particular area on multiple occasions, by way of example at different times and, consequently, in different traffic situations, and accordingly identify the area. The procedure of identifying the area is understood in this case to be equal to collecting the environmental data for this area or in this area.

The multiplicity of transportation vehicles may operate independently of one another but yet be described overall as a fleet or swarm. The environmental data, which are collected in each case individually by these transportation vehicles of the fleet or of the swarm, and/or the priority action that is determined therefrom, may accordingly be described collectively, in other words as a whole, as swarm data. The priority rules are therefore not determined with reference to an individual case or an individual situation but rather from the swarm data or with reference to the swarm data. As a consequence, it is not possible for individual or special situations in which the respective transportation vehicle and/or the respective other traffic participant do not adhere to the rules to result in a false priority rule being determined for the respective area. In so doing, it is a known fact that most traffic participants conform to the rules in most situations, in other words observe the legal traffic regulations.

By virtue of using the swarm data in this manner, the swarm data being collected by regular transportation vehicles, it is possible to determine a respective relevantly valid or appropriate priority rule for a multiplicity of areas, in other words, crossroads and junction areas, without for this purpose relevant qualified personnel having to attend by way of example each of these areas purposefully and specifically to determine the respective priority rule. Consequently, it is possible to determine wide-ranging priority rules in an automated manner and with a particularly small outlay. These determined priority rules may be used efficiently for different application purposes, such as, for example, the rule-based operation of transportation vehicles, the production of maps or sets of data, statistical evaluation and the like etc.

Since, in addition the actual behavior of the transportation vehicles and of the other traffic participants, in other words an actual traffic flow, is identified in the respective areas, in particular, as a basis for determining the priority rules, the disclosed method is not dependent upon an automatically recognizable or also only existing road signs or road equipment in the respective areas. Consequently, it is possible to exploit in a technical manner the fact that, even when road signs or road equipment are missing or incomplete or by way of example damaged, human drivers may generally recognize or evaluate in a reliable manner at least for the most part or on average the respective traffic situation and the priority rules that are valid according to the regulations and are to be used.

The term 'road' is to be understood generally in terms of the present disclosure and may refer to or include any type of traffic route. The disclosure applies in other words may therefore be used by way of example also for areas or traffic situations in which a non-metaled forest path or field path is regarded as a road in actual terms of the disclosure. It is likewise possible by way of example for the first or the second road to be an entrance to or exit from a demarcated area, by way of example private property.

It is provided that a priority rule for an area is only determined if for this area at least one predetermined number of determined priority actions is available, in other words has been determined. Likewise, the priority rule for an area may be determined from new, updated, amended and/or checked by way of example using the particular priority action that has been determined for this area. It is that the priority rule is only provided in the at least one transportation vehicle that is to be operated if a predetermined confidence value is achieved for the respective priority rule. This may then be case by way of example if the priority rule has been determined from at least the predetermined number of predetermined priority actions, in other words is based on at least one predetermined number of predetermined priority actions. It is likewise possible to take into consideration by way of example a scatter width or variance of the priority actions. The confidence value may then be achieved by way of example if a random priority action that is in addition taken into consideration has less than a predetermined influence on the resulting priority rule. It is possible in this manner to increase the safety and reliability of the predetermined priority rules and of the operation of the transportation vehicle, in other words the safety in traffic events is increased.

The at least one transportation vehicle that is to be operated, in other words the particular transportation vehicle, the operating or operation of which is to be assisted, may be assisted or is to be assisted by virtue of providing the predetermined priority rule or priority rules, may be one of the multiplicity of transportation vehicles that collect the environmental data. However, this is not necessarily the case. In other words, it is possible by the priority rules that are determined based on the swarm data to also assist such transportation vehicles that themselves are not designed or configured to collect environmental data or to determine the respective priority action and/or to transmit the environmental data and/or the respective priority action to a corresponding data processing unit. It may however likewise be possible to provide the determined priority rules to one, multiple or all the multiplicity of the transportation vehicles, in other words to the fleet or swarm of transportation vehicles.

The environmental data may be processed in a disclosed embodiment in each case in the transportation vehicle that has collected the respective environmental data using a respective local data processing unit of the transportation vehicle so as to determine the priority rules. The respective priority actions may therefore be determined locally in each case by way of example by respective assist systems or data processing units of one, of some or of all the transportation vehicles.

As a consequence, the priority rules are directly or indirectly available for use, in other words available for the operation of the respective transportation vehicle. The collected environmental data and/or the priority actions that are determined therefrom may be likewise by way of example transmitted or exchanged directly from transportation vehicle to transportation vehicle, by way of example by Car-2-car communication. It is likewise possible to transmit or exchange the environmental data and/or the priority action between the individual transportation vehicles by involving a remote server unit. On the basis of the database that is then available in one or more of the transportation vehicles, it is then possible from environmental data that are collected by multiple, in other words by the multiplicity of transportation vehicles, and/or from the priority actions that are determined by the multiplicity of transportation vehicles, in one, multiple or all the transportation vehicles, by way of example using the respective assist system or the respective data processing unit, to determine the respective priority rule or the priority rules.

It is likewise possible to transmit the collected environmental data so as to determine the priority actions to the remote server unit that then also determines the priority rules.

In at least one disclosed embodiment, the environmental data and/or the determined priority actions are transmitted automatically by the transportation vehicles to a remote central server unit—possibly a Cloud or Backend server. This central server unit automatically determines priority rules therefrom. The central server unit may transmit the determined priority rules automatically to the at least one transportation vehicle that is to be operated, in particular, to the multiplicity of transportation vehicles. In other words, therefore data that have been collected by many different transportation vehicles in different crossroads and/or junction areas that are arranged in a spatially distributed manner or data that relate thereto are processed at a central site.

As a consequence, the priority rules may be determined in a rapid and reliable manner with a small communications overhead, in other words, in an efficient manner and for a large spatial area. In addition, it is likewise possible to transmit to the central server unit identified own movements of the respective transportation vehicle and/or identified movements of the respective other traffic participants and/or a respective identified road equipment and/or the like etc. to the central server unit. These properties are explained in more detail below. Moreover, in so doing the central server unit renders it possible that the automatically determined priority rules may be checked at the central site in a simple manner prior to the priority rules being transmitted or provided to the transportation vehicle so as to assist an operation of the at least one transportation vehicle.

As a consequence, it is possible to achieve an improved level of safety. The priority actions may therefore be determined locally in the individual transportation vehicles and then transmitted to the remote server unit that determines the priority rules therefrom. Although the outlay for locally processing the data or for performing the calculations is increased as a result of determining the priority action and/or the traffic rules in the respective transportation vehicle, it is however possible to reduce the band width or data volume required for transmitting data to the server unit. By virtue of determining or calculating the priority action and/or the priority rules by the server unit, it is possible on the other hand by way of example to improve the efficiency of the calculating procedure and to check or verify the respective results in a simple manner.

As an example, whilst driving along a road the transportation vehicle may enter an area in which a second road joins from the right. Using the environment sensor system, the transportation vehicle may then identify that another traffic participant, by way of example another transportation vehicle, is located on the second road, the other traffic participant likewise approaching this junction area. By virtue of processing the environmental data and taking into consideration the position and movement of its own transportation vehicle, it is then possible by way of example to determine that its own transportation vehicle stops before the junction of the second road and the other traffic participant traverses the junction area first. This or a similar traffic situation may be experienced by more than one of the multiplicity of transportation vehicles.

It is likewise possible by way of example for the other traffic participant to be one of the multiplicity of transportation vehicles and therefore to identify the same traffic situation in the same area from a different perspective. If subsequently multiple sets of environmental data are collected for this area and processed or rather evaluated, it is then possible to derive or determine from the entire data relating to this area that from the point of view of the transportation vehicle the priority rule "give way to the right" applies. This may consequently also be determined if a corresponding traffic sign is not provided in this area. However, this rule for this area may also be apparent to the human driver of the transportation vehicle and to the other transportation vehicle that is traveling on the second road, in other words to the other traffic participant, without corresponding road signs. Therefore, once this rule has been automatically determined for this area, it is subsequently possible to use the rule for the automated, safe and correct operation of autonomous transportation vehicles in this area or through this area. In addition or alternatively, during the operation of the transportation vehicle the driver of the transportation vehicle that is to be operated may be assisted by way of example by a display of the determined priority rule or by a corresponding optical and/or acoustic notification or a warning if in the future the driver enters an area for which a priority rule has already been determined.

In at least one disclosed embodiment, so as to determine the respective priority action in each case its own movement of the respective transportation vehicle and a movement of the respective other traffic participant in the respective area are identified and tracked. In other words, therefore not only is a static or instantaneous situation identified but rather its temporal development, therefore a dynamic traffic situation. In other words, a traffic flow in the respective area or through the respective area is therefore identified or rather determined from the environmental data. A movement in this sense is understood to be a movement state which also includes a standstill or a standstill of the transportation vehicle and/or of the other traffic participant. Therefore, a respective relative movement between the respective transportation vehicle and the respective at least one other traffic participant, in particular, multiple or all traffic participants located in the respective area, is identified as part of the respective traffic situation using the respective surroundings or environment sensor system.

With reference to the identified own movement of the transportation vehicle and the movement of the other traffic participant, it is therefore possible to determine whether the transportation vehicle first traverses or drives through the respective area or whether the other traffic participant first traverses or drives through the respective area prior to the respective transportation vehicle, in other words the respective priority action for the respective area. The movement of its own transportation vehicle may be automatically determined by corresponding transportation vehicle on-board sensors, feedback systems, control units and/or the like. By way of example, a motor control, a gearbox setting, a tachometer, at least one wheel encoder, a steering angle and/or the like etc. may be monitored and accordingly evaluated. The movement of the respective other traffic participant may be identified as part of the environmental data. So as to track the movement of the other traffic participant, the environmental data may be collected continuously or, by way of example, depending upon the technical design, at a frequency of by way of example at least 10 Hz. It is possible in this manner to determine the respective traffic flow, therefore the priority action for the area, in a reliable manner from the environmental data.

In at least one disclosed embodiment, a respective geographical position for the areas is automatically determined and the determined priority rules are automatically incorporated as a data layer into a map based upon the determined positions. In other words, the determined priority rules are therefore allocated to geographical or spatial data by combining them with the determined geographical positons of the areas for which the priority rules have been determined. The map in this case is to be understood in terms of the present disclosure in the conventional sense as a data set that indicates a spatial arrangement of physical features, in particular, a road course, for an area that is significantly greater that in each case an individual one of the areas, in other words of the crossroads or junction areas. The incorporation of the determined priority rules into the map as a data layer renders it possible in so doing to handle this additional or supplementary data layer in a standardized manner. Since moreover a map, in other words a map data set, is already provided in a multiplicity of present-day transportation vehicles and in all autonomous transportation vehicles, it is possible in a simple manner to update these already available maps or navigation data sets.

In at least one disclosed embodiment, road equipment, in particular, a traffic sign, a light signal display and/or a lane marking, which are present in the respective area, are identified using the respective environment sensor system. The identified road equipment are then automatically taken into consideration when determining the priority rules. In other words, the priority rules are therefore determined based upon the respective road equipment. The respective priority rule may be reliably correctly determined by virtue of taking into consideration the road equipment that may be present. By way of example, a determined traffic situation that would be consistent with two different priority rules for this area may develop or unfold in an area in a particular manner.

It is by way of example possible to determine from the environmental data that another traffic participant who is approaching on a road that is joining from the right traverses the respective area first. This may be due to the fact that for the respective area the priority rule "give way to the right" applies or accordingly that the road that is joining from the right is declared as the priority road, which may be displayed by way of example by the traffic sign no. 301 or by the traffic sign no. 306, that may then be identified as part of the road equipment. In addition or alternatively, by way of example an auxiliary sign may be present, which indicates a bend in the priority road. It is therefore possible by virtue of automatically identifying and taking into consideration these traffic signs, in other words the respective road equipment, to unambiguously select and determine the respective relevant priority rule.

It is likewise possible by way of example to identify and evaluate the road equipment to determine whether the determined priority action is consistent with the identified road equipment. It is therefore possible by way of example to avoid situations in which a driver or a traffic participant ignores by way of example their regular right of way leading to an incorrect priority rule being determined for the respective area. In addition, it is possible to reduce an allocated confidence value in the case of an automatically detected inconsistency or discrepancy between the determined priority action and the road equipment. The respective road equipment may be by way of example likewise identified using the environment sensor system, in other words from the environmental data. In addition or alternatively, the road equipment may be by way of example called up from one or more other data sources. Such a data source may be by way of example a corresponding data layer of the map.

In at least one disclosed embodiment, one type of the respective other traffic participant is automatically determined and taken into consideration when determining the priority rules. In other words, the priority rules may be determined therefore based upon the type or upon a kind of the respective other traffic participants. The priority rules may therefore be determined specifically for by way of example each type or kind or a combination of types or kinds of all traffic participants that are involved in the respective traffic situation. In addition, it is possible by virtue of correspondingly processing the environmental data to automatically classify the other traffic participants with respect to their type or their kind, by way of example as pedestrians, as cyclists, as a transportation vehicle or the like etc. In addition, it is possible by way of example to use an image processing algorithm and/or an object recognition algorithm. As a consequence, it is also possible to recognize and determine complex priority rules.

By way of example, it is possible for a one-way road that is leading away from the first road and may however be driven along by cyclists in the opposition direction to branch off to the right from the first road that is being driven along by the transportation vehicle. It is then possible in accordance with the "give way to the right" rule that a cyclist has right of way over a transportation vehicle when the cyclist is approaching from the branching one-way road in the opposite direction to the permissible drive direction of the first road for transportation vehicles. However, this applies in this situation specifically for cyclists, in other words only for a particular type of traffic participants. It is likewise possible by virtue of taking into consideration the type of other traffic participant by way of example to automatically determine the rule, in other words it is possible to determine that pedestrians on a pedestrian crossing [zebra crossing] have absolute priority over transportation vehicles but this does not apply for cyclists who are riding their cycle rather than are pushing the cycle.

In at least one disclosed embodiment, a respective occupant monitoring unit of the respective transportation vehicle is used to identify a behavior of a driver of the respective transportation vehicle, in particular, a respective direction in which the driver is looking and/or a respective gesture, and to take the behavior into consideration when determining the priority rules. By way of example, it regularly occurs that a driver waivers the right of way to which they are actually entitled in accordance with the respective valid priority rule and allows the other traffic participant to traverse or drive through the respective area first and this is indicated by looking in the direction of the respective other traffic participant and a corresponding gesture by way of invitation.

Although it has hitherto not been possible to automatically determine a meaning or intention of a gesture of the respective driver with 100% reliability, nonetheless it is possible insofar as a corresponding gesture is identified to reduce by way of example a confidence value of the priority rule that is determined from the respective priority action. As a consequence, it is possible to increase the reliability and accuracy of the determined priority rules. Generally therefore the behavior of the respective driver that is identified using the occupant monitoring unit may be automatically used as an indication as to whether in the case of the automatically determined priority action it is a standard situation or a special or extraordinary situation. In addition, it is possible by way of example to store in a corresponding database by way of example multiple predetermined gestures, types of gestures and/or characteristics or characterizations of typical gestures that may indicate that priority has been awarded or that the due priority has been waivered and then compare the gestures with the respective identified gesture. It is likewise beneficial by way of example to use a method of machine learning to learn the behavior of the respective driver with the result that the meaning of the respective behavior is identified in an accurate and reliable manner specifically for each driver and may be accordingly taking into consideration when determining the priority rules.

In at least one disclosed embodiment, the at least one transportation vehicle that is to be operated in an at least partly-automated drive mode is automatically controlled based upon the determined priority rules through the areas for which the priority rules have been determined. This drive mode may be therefore a partly-, highly- or fully-automated or driverless or autonomous drive mode, by way of example in accordance with the correspondingly known five-stage system. The at least one transportation vehicle that is to be operated is the particular transportation vehicle whose operation and guidance is to be assisted by the disclosed method. An autonomous transportation vehicle may fundamentally evaluate individually and from new each traffic situation with reference in each case to currently collected environmental data to determine a driving strategy. The procedure of controlling or operating the transportation vehicle in the at least partly-automated drive mode based upon the determined priority rules may, however, by way of example, make it easier for other traffic participants to anticipate and assess an action of the respective autonomous transportation vehicle. As a consequence, it is possible to achieve a more fluid and safer traffic flow.

Apart from the disclosed method, a further disclosed embodiment is an assist system for assisting an operation of the transportation vehicle. The disclosed assist system comprises a data processing unit that for its part comprises a communication interface and is configured so as via the communication interface to receive environmental data that are collected using an environment sensor system and that characterize a traffic situation in an environment of the transportation vehicle. In accordance with the disclosure, the assist system, in particular, the data processing unit, is configured so as to determine from the received environmental data for an area in which a first road that is being driven along by the transportation vehicle meets a second road on which another traffic participant is located whether the transportation vehicle awards the other traffic participant priority with the result that the other traffic participant traverses the area prior to the transportation vehicle or conversely. Furthermore, the disclosed assist system, in particular, the data processing unit, is configured so as to automatically determine therefrom a priority rule for the respective area and to provide the priority rule so as to assist the operation of the transportation vehicle. In addition, the assist system may include a data storage device in which a program code is stored that codes or represents the method operations of the disclosed method. Furthermore, the data processing unit may include a processor that is coupled to this data storage device so as to implement this program code.

In other words, the disclosed assist system is therefore configured so as to implement or perform at least one facet of the disclosed method. Accordingly, the components and devices that are mentioned in conjunction with the disclosed method may be the corresponding components and devices of the disclosed assist system. The disclosed assist system may include the central server unit. The central server unit may then include the data processing unit. Likewise, the data processing unit may be part of the central server unit or conversely. Likewise, the data processing unit may however be provided by way of example completely onboard the transportation vehicle. The disclosed assist system is then therefore a device for the respective transportation vehicle. The disclosed assist system may include further components or devices, by way of example the environment sensor system, the occupant monitoring unit, a device for performing the machine learning procedure, a sensor system for identifying and tracking the movement of its own transportation vehicle so as to determine the respective geographical position of the respective areas and/or the like etc.

A further disclosed embodiment is a transportation vehicle having a disclosed assist system. The disclosed transportation vehicle may therefore be configured so as to perform or implement at least one facet of the disclosed method. The disclosed transportation vehicle may be the transportation vehicle that is mentioned in conjunction with the disclosed method and/or in conjunction with the disclosed assist system.

The disclosure also includes further developments of the disclosed assist system and further developments of the disclosed transportation vehicle, the further developments comprising features such as are described in conjunction with the further developments of the disclosed method. To avoid unnecessary redundancy, the corresponding further developments are not explicitly described separately here for all properties of the disclosure.

An exemplary embodiment is explained below. In the case of the exemplary embodiment, the described components of the disclosed embodiment represent in each case individual features of the disclosure that are to be considered independently of one another and that further develop the disclosure in each case also independently of one another and consequently also are to be regarded individually or in another combination than the illustrated combination as a component of the disclosure. Furthermore, the described embodiment may also be supplemented by further of the already described features of the disclosure.

FIG. 1 illustrates a schematic overview of an exemplary traffic situation 1. The figure specifically illustrates a first road 2 being joined by a second road 3. The figure illustrates schematically an immediate junction area 4 in which the currently illustrated traffic situation 1 occurs. In this case, a transportation vehicle 5 is located on the first road 1. The transportation vehicle 5 comprises an environment sensor system 6, a data processing unit 7, which is coupled to the environment sensor system and includes a communication module 8, a navigational device 9, which is connected to the data processing unit 7, and an occupant monitoring unit 10 that is likewise connected to the data processing unit 7.

The data processing unit 7 is configured so as using the communication module 8 to communicate with a remote server 12 via a bidirectional cableless data connection 11 that is indicated in the figure schematically.

A pedestrian 13 and a third-party transportation vehicle 14 that is located on the second road 3 are located as further traffic participants in the junction area 4.

Dynamics of the traffic situation 1 are indicated in the figure by corresponding arrows. A first arrow indicates a path 15 of the transportation vehicle 5, a second arrow indicates a path 16 of the pedestrian 13 and a third arrow indicates a path 17 of the third-party transportation vehicle 14. The transportation vehicle 5 would therefore like to drive through the junction area 4 on the first road 2 along the path 15. The pedestrian 13 coming from the second road 3 would like to traverse the first road 2 along the path 16. The third-party transportation vehicle 14 drives along the path 17 on the second road 3 until it arrives at a stop line 18 where the second road 3 meets the first road 2.

Figure 2:
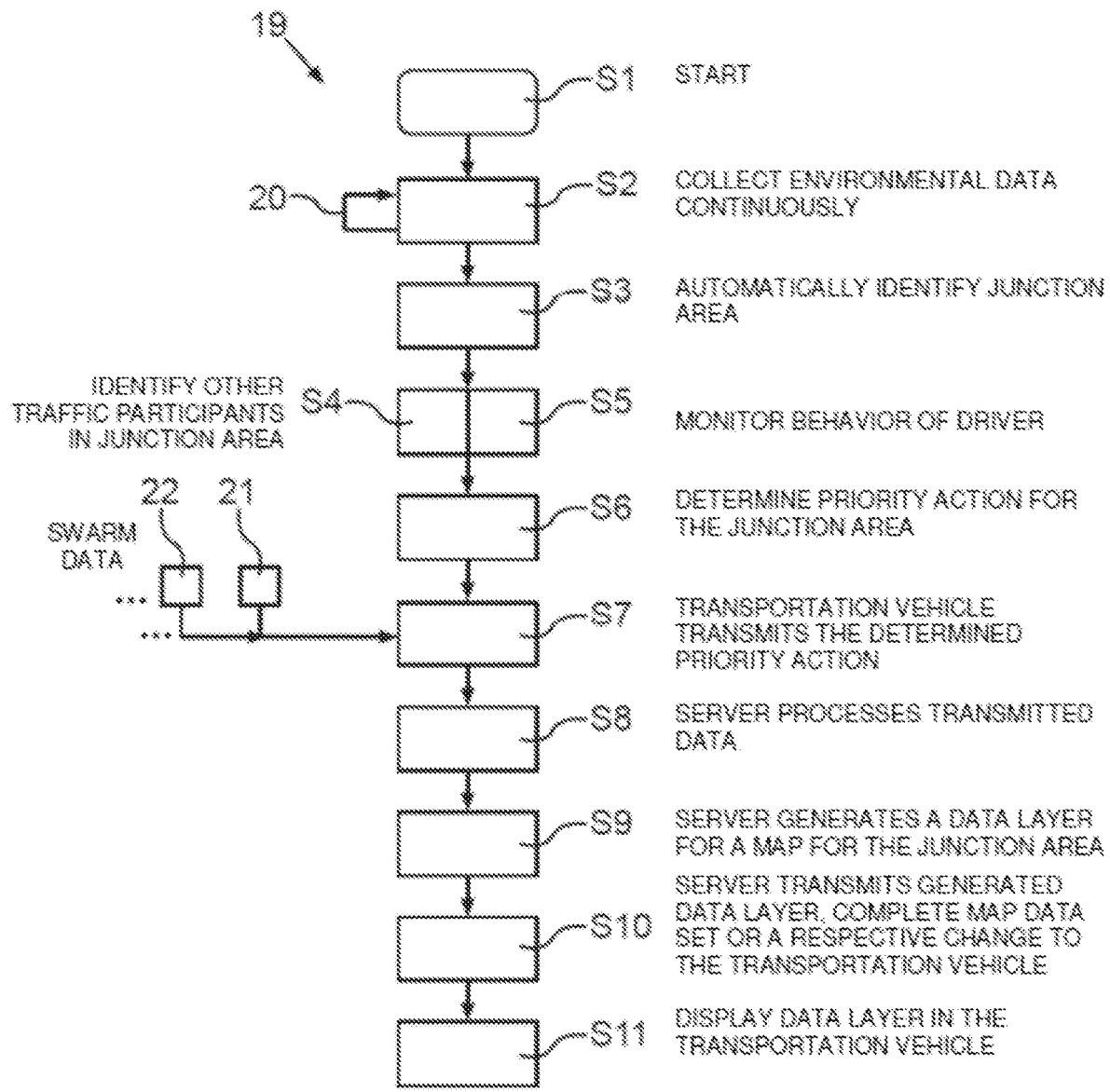
FIG. 2 illustrates an exemplary schematic flow diagram of a method for assisting an operation of a transportation vehicle.

FIG. 2 illustrates an exemplary schematic flow diagram 19 of a method for assisting an operation of a transportation vehicle of the transportation vehicle 5. This method, in other words the flow diagram 19, is to be explained below with reference to FIG. 1.

The method starts with a method operation at S1. An assist system of the transportation vehicle 5 is activated in this operation. This assist system includes in this case the environment sensor system 6, the data processing unit 7, the occupant monitoring unit 10 and the navigational device 9.

In a method operation at S2, the transportation vehicle 5 drives along the road 2, wherein environmental data, including data relating to road equipment in the area of the first road 2, are collected continuously using the environment sensor system 6. The stop line 18 is perhaps identified here as road equipment. This procedure of continuously collecting the environmental data is indicated schematically in the figure by a repeat path 20 and the procedure may also be performed during the subsequent method operations.

In a method operation at S3, the transportation vehicle 5 moves into the junction area 4, in other words into the traffic situation 1 that is illustrated in FIG. 1. By virtue of processing the continuously collected environmental data by the data processing unit 7, the junction area 4 is automatically identified.

As an alternative to that illustrated by way of example here, the method operations at S2 and S3 may likewise be performed essentially in the reverse order. Therefore, after the method operation at S1 initially—by way of example with reference to available map data and a continuously determined positon of the transportation vehicle 5—it could be possible to automatically identify that the transportation vehicle 5 has arrived at the junction area 4 and then the procedure of automatically collecting the environmental data for this junction area 4 could be activated.

In one method operation at S4, the other traffic participants located in the junction area 4, in this case therefore the pedestrian 13 and the third-party transportation vehicle 14, including their respective type and their respective movement behavior, are identified by virtue of processing the environmental data. It is therefore automatically determined in this operation where in the junction area 4 which types of traffic participants are located, whether the traffic participants are moving or not and where applicable in which direction or along which trajectory they are moving. In so doing, it is possible to extrapolate a respective trajectory that is determined from multiple identified positions to determine a respective expected movement. The positions and movements of the other traffic participants are determined, in this case, relative to the transportation vehicle 5. In this case, the positions and movements of the transportation vehicle 5, the pedestrian 13 and the third-party transportation vehicle 14 are determined with regard to the junction area 4. In parallel, a behavior of a driver of the transportation vehicle 5 is monitored in a method operation at S5 using the occupant monitoring unit 10, in particular, with regard to the direction in which the driver is looking and a gesture which may be interpreted as communication with the pedestrian 13 and/or with a driver of the third-party transportation vehicle 14.

In a method operation at S6, the traffic situation 1 has developed dynamically beyond the snapshot illustrated in FIG. 1 and a priority action for the junction area 4 is determined from the determined positions and movements. Specifically, in the present example the transportation vehicle 5 is initially stopped in the position illustrated in FIG. 1, wherein by a corresponding gesture the driver has given the pedestrian 13 to understand that the pedestrian may traverse the first road 2 along the path 16 prior to the transportation vehicle 5. Simultaneously, the third-party transportation vehicle 14 has come to a standstill at the stop line 18. Subsequently, the transportation vehicle 5 has traversed the junction area 4 along the path 15 prior to the third-party transportation vehicle 14.

In one method operation at S7, the transportation vehicle 5 transmits to the server 12 via the data connection 11 the priority action that has been determined for the junction area 4 together with its geographical position, a reference to the identified gesture of the driver of the transportation vehicle 5, by way of example, as a reduced confidence value—and with an identified road equipment of the junction areas 4, in this case the stop line 18. The previous method operations are also performed in a similar manner to that for the junction area 4 overall more than once for other traffic situations [not illustrated in detail here] with respective other traffic participants. In so doing, the transportation vehicle 5 and the transportation vehicles that correspond thereto in the other traffic situations form a swarm of transportation vehicles that transmits to the server 12 corresponding swarm data 21, 22 that is indicated schematically in the figure. The swarm data 21, 22 correspond in this case to the priority actions that are determined by the other transportation vehicles of the swarm, positions, road equipment, types of respective traffic participants involved etc. such as the transportation vehicle 5 has also transmitted to the server 12 in the described manner.

In a method operation at S8, the server 12 processes the data that is transmitted by the transportation vehicle 5 and the swarm data 21, 22 and the server determines therefrom a priority rule that is valid for the junction area 4. Depending upon the types of traffic participants involved, the server 12 may determine for the junction area 4 likewise multiple priority rules for specific types of traffic participants or combinations of traffic participants who meet one another in the junction area 4. In this case, it is determined for the junction area 4 by taking into consideration the gesture of the driver of the transportation vehicle 5 that precedes the pedestrian 13 traversing the first road 2 and by taking into consideration the stop line 18 as a priority rule for the junction area 4 that transportation vehicles that are driving on the first road 2 have priority over transportation vehicles that are approaching on the first road 2 on the joining second road 3.

In a method operation at S9, the server 12 generates a data layer for a map from the priority rule that is determined for the junction area 4 and from the geographical position of the junction area 4 likewise as for further priority rules and positions of crossroads and junction areas [not illustrated here] and the server combines this data layer into the map, in other words into a map data set.

In a method operation at S10, the generated data layer, the complete map data set or a respective change that has arisen with respect to the previous performance of the method is transmitted to the transportation vehicle 5.

In a method operation at S11, the data layer is displayed, in other words the determined priority rules are displayed in the transportation vehicle 5 using the navigational device 9 as part of a navigational map to assist the driver during the operation of the transportation vehicle 5 if the driver has arrived at the junction area 4 or at one of the other areas for which a respective priority rule has been determined. Likewise, in the method operation at S11 the transportation vehicle 5 may now upon again arriving at and traversing the junction area 4 or upon arriving at and traversing one of the other areas in an autonomous drive mode refer back to the determined priority rules as supporting data.

Overall, the described examples illustrate how the disclosure may render it possible to operate a transportation vehicle in a particularly safe and reliable manner.

LIST OF REFERENCE NUMERALS

1 Traffic situation
2 First road

3 Second road
4 Junction area
5 Transportation vehicle
6 Environment sensor system
7 Data processing unit
8 Communication module
9 Navigational device
10 Occupant monitoring unit
11 Data connection
12 Server
13 Pedestrian
14 Third-party transportation vehicle
15 Path (of the transportation vehicle 5)
16 Path (of the pedestrian 13)
17 Path (of the third-party transportation vehicle 14)
18 Stop line
19 Flow diagram
20 Repeat path
21, 22 Swarm data
S1-S11 Method operations

The invention claimed is:

1. A method for assisting an operation of at least one transportation vehicle, the method comprising:
collecting environmental data that characterize a surrounding traffic situation, wherein the environmental data are collected using an environment sensor system comprised of a plurality of transportation vehicles including the at least one assisted transportation vehicle, wherein the environmental data are collected automatically in at least one area in which a first road that is being driven along by the at least one assisted transportation vehicle and a second road, on which one or more other traffic participants are located, intersect;
automatically determining a priority action for each intersection area based on the automatically collected environmental data, wherein the automatically determined priority action indicates which of the at least one assisted transportation vehicle or the other traffic participants is awarded priority to traverse the area where the first and second roads intersect; and
automatically determining at least one priority rule for each intersection area based on the automatically determined priority actions
wherein the assisted transportation vehicle is operated in an at least partly-automated drive mode, wherein the assisted transportation vehicle is automatically controlled based upon the on determined priority rules through intersection areas for which the priority rules have been determined.

2. The method of claim 1, wherein the determined at least one priority rule are provided in the at least one assisted transportation vehicle either via transmission to the at least one assisted transportation vehicle or via determination within the at least one assisted transportation vehicle.

3. The method of claim 1, wherein the at least one priority rule is determined by a data processing unit located in at least one of the transportation vehicles of the environment sensor system that has collected the environmental data, wherein that at least one of the transportation vehicles then automatically transmits the determined priority rule to a remote server unit.

4. The method of claim 1, wherein the environmental data and/or the determined priority actions are automatically transmitted by the transportation vehicles to a central server unit that determines the priority rules therefrom.

5. The method of claim 1, further comprising identifying and tracking an own movement of the assisted transportation vehicle and movement of the one or more other traffic participants in the respective area to determine the respective priority action for the intersection area.

6. The method of claim 1, wherein a geographical position for the intersection area is automatically determined and the one or more determined priority rules are automatically incorporated as a data layer into a map based upon the determined geographic position.

7. The method of claim 1, wherein road equipment, a light signal display and/or a lane marking, which are present in the intersection area, are identified by environment sensor system and are taken into consideration when determining the at least one priority rule for the intersection area.

8. The method of claim 1, wherein a type of the other traffic participant is automatically determined and taken into consideration when determining the at least one priority rule for the intersection area.

9. The method of claim 1, wherein an occupant monitoring unit of the assisted transportation vehicle identifies a behavior of a driver of the assisted transportation vehicle and takes the identified behavior into consideration when determining the at least one priority rule for the intersection area.

10. An assist system for assisting an operation of at least one transportation vehicle, the assist system comprising:
a data processing unit that comprises a communication interface and is configured to receive environmental data via the communication interface that are collected automatically using an environment sensor system, wherein the environmental data characterize a traffic situation in an environment of the at least one transportation vehicle, wherein the data processing unit is configured:
to automatically determine, from the received environmental data for at least one area in which a first road that is being driven along by the at least one assisted transportation vehicle intersects a second road on which another traffic participant is located, a priority action which indicates which of the at least one assisted transportation vehicle or the other transportation vehicle is awarded priority to traverse the area where the first and second roads intersect; and
to automatically determine at least priority rule for each intersection area based on the automatically determined priority rules respective area and to automatically provide the at least one priority rule to assist the operation of the transportation vehicle,
wherein the assisted transportation vehicle is operated in an at least partly-automated drive mode, wherein the assisted transportation vehicle is automatically controlled based upon the on determined priority rules through intersection areas for which the priority rules have been determined.

11. The assist system of claim 10, wherein the determined at least one priority rule are provided in the at least one assisted transportation vehicle either via transmission to the at least one assisted transportation vehicle or via determination within the at least one assisted transportation vehicle.

12. The assist system of claim 10, wherein the at least one priority rule is determined by a data processing unit located in at least one of the transportation vehicles of the environment sensor system that has collected the environmental data, wherein that at least one of the transportation vehicles then automatically transmits the determined priority rule to a remote server unit.

13. The assist system of claim 10, wherein the environmental data and/or the determined priority actions are automatically transmitted by the transportation vehicles to a central server unit that determines the priority rules therefrom.

14. The assist system of claim 10, wherein an own movement of the assisted transportation vehicle and movement of the one or more other traffic participants are identified and tracked in the respective area to determine the respective priority action for the intersection area.

15. A transportation vehicle having an assist system for assisting an operation of at least one transportation vehicle, the assist system comprising:
 a data processing unit that comprises a communication interface and is configured to receive environmental data via the communication interface that are collected automatically using an environment sensor system, wherein the environmental data characterize a traffic situation in an environment of the at least one transportation vehicle, wherein the data processing unit is configured:
 to automatically determine, from the received environmental data for at least one area in which a first road that is being driven along by the at least one assisted transportation vehicle intersects a second road on which another traffic participant is located, a priority action which indicates which of the at least one assisted transportation vehicle or the other transportation vehicle is awarded priority to traverse the area where the first and second roads intersect; and
 to automatically determine at least one priority rule for each intersection area based on the automatically determined priority rules respective area and to automatically provide the at least one priority rule to assist the operation of the transportation vehicle,
 wherein the assisted transportation vehicle is operated in an at least partly-automated drive mode, wherein the assisted transportation vehicle is automatically controlled based upon the on determined priority rules through intersection areas for which the priority rules have been determined.

16. The transportation vehicle of claim 15, wherein the determined at least one priority rule are provided in the at least one assisted transportation vehicle either via transmission to the at least one assisted transportation vehicle or via determination within the at least one assisted transportation vehicle.

17. The transportation vehicle of claim 15, wherein the at least one priority rule is determined by a data processing unit located in at least one of the transportation vehicles of the environment sensor system that has collected the environmental data, wherein that at least one of the transportation vehicles then automatically transmits the determined priority rule to a remote server unit.

18. The transportation vehicle of claim 15, wherein the environmental data and/or the determined priority actions are automatically transmitted by the transportation vehicles to a central server unit that determines the priority rules therefrom.

19. The transportation vehicle of claim 15, wherein an own movement of the assisted transportation vehicle and movement of the one or more other traffic participants are identified and tracked in the respective area to determine the respective priority action for the intersection area.

* * * * *